May 18, 1926.
W. VAN GUILDER
MOTOR VEHICLE SIGNAL OPERATING SWITCH
Filed Nov. 18, 1921
1,584,909
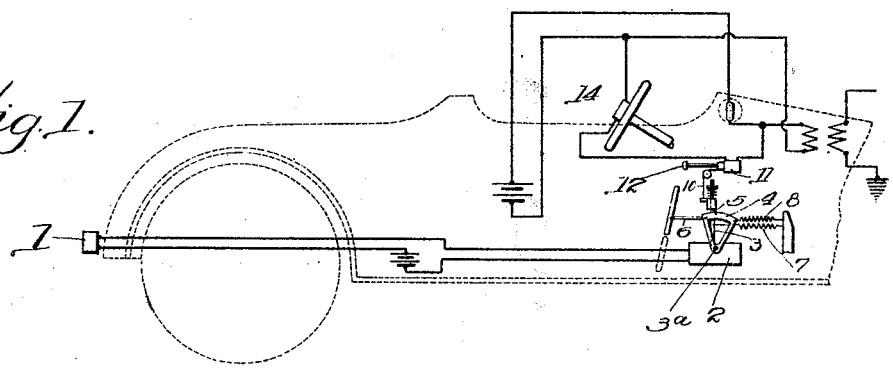
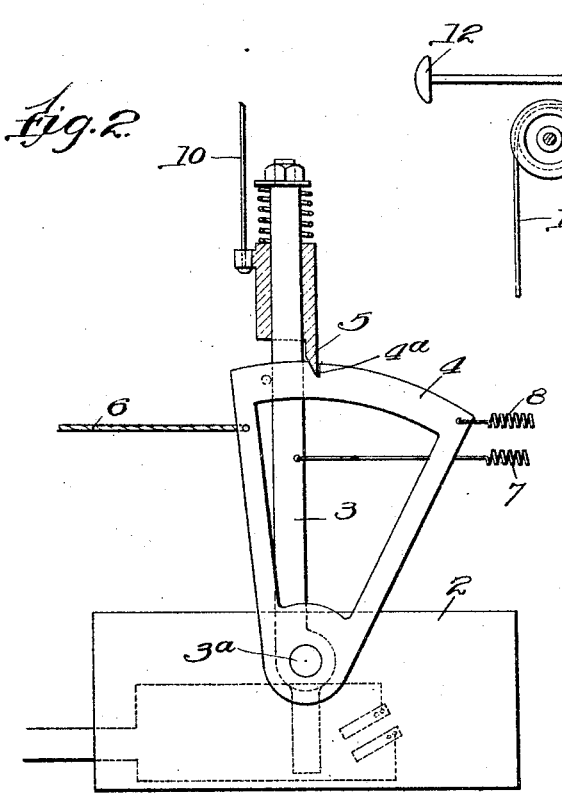
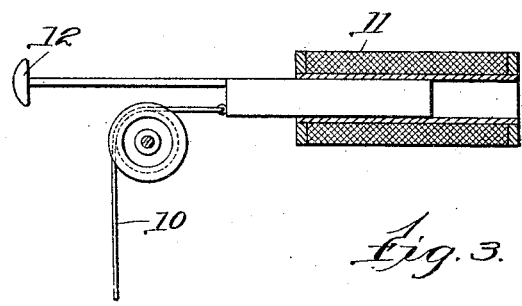
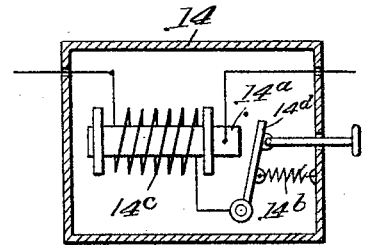
Inventor:
Walter Van Guilder,
by Burton & Burton
his Attys.

Patented May 18, 1926.

1,584,909

UNITED STATES PATENT OFFICE.

WALTER VAN GUILDER, OF CHICAGO, ILLINOIS, ASSIGNOR TO STEWART-WARNER SPEEDOMETER CORPORATION, OF CHICAGO, ILLINOIS, A CORPORATION OF VIRGINIA.

MOTOR-VEHICLE SIGNAL-OPERATING SWITCH.

Application filed November 18, 1921. Serial No. 516,005.

The purpose of this invention is to provide an improved device of the nature of a switch controlling an electric circuit for controlling the operation of a signal upon a motor vehicle. It consists in the elements and features of construction shown and described as indicated in the claims.

In the drawings:—

Figure 1 is a wiring diagram of a construction embodying this invention.

Figure 2 is a detail elevation of mechanical operating connections from the vehicle brake control to the switch in question.

Figure 3 is an elevation of operating means for disengaging the catch which secures connection from the brake control to the switch, said operating means comprising both a solenoid and a manually operable member.

Figure 4 is a plan of a switch device mounted on the steering wheel for controlling the solenoid.

In Figure 1 of the drawings the device of this invention is represented diagrammatically in association with a motor vehicle on which it controls a signal at the rear. This signal is indicated at 1, a switch for controlling the signal-energizing circuit is indicated by the switch housing shown at 2. 3 indicates the switch lever fulcrumed at $3^a$. Fulcrumed coincidentally with the lever, there is shown a quadrant lever, 4, engageable with the switch lever by a one-way engaging catch, 5. 6 indicates operating connections from the brake or clutch control to the quadrant lever and thereby to the switch lever with which it is engaged. 7 is a spring for retracting the switch lever to circuit-opening position. 8 is a spring which reacts on the quadrant lever for rocking it about its fulcrum with respect to the switch lever in the direction for bringing its notch, $4^a$, into position for engagement by the catch. 10 is a small wire cable extending from the catch to a position where it may be connected with means for pulling upon it to disengage the catch. As illustrated two operating means for this purpose are provided, one of which consists of a solenoid, 11, to whose core member a cable is connected, so that upon energizing the solenoid the core member pulls upon the cable and disengages the catch. The core member of the solenoid may be merely a guide rod, the solenoid spool constituting the guide, (regardless of the solenoid as such); and an operating handle, 12, extending off from the solenoid core then serves as a means for manually operating the cable to release the catch. The solenoid circuit wires are desirably extended to a make-and-break device on the steering wheel, said device being preferably of the nature of a switch 14, and diagrammatically so shown in Figure 4, at such position on the steering wheel that the operator can conveniently open and close the solenoid circuit to cause the solenoid either to retract and hold the catch disengaged from the quadrant lever, or to leave it free for its engagement therewith.

Desirably for a purpose hereinafter explained, the solenoid energizing circuit is in shunt with the ignition circuit, branching therefrom beyond the ignition switch, so that regardless of the closing of the snap switch, 14, at the steering wheel, the solenoid will be de-energized and cease to operate when the ignition switch is operated for cutting out the spark and stopping the engine. The purpose of this is that if the driver has closed the switch, 14, for energizing the solenoid to disengage the catch, 5, and thereby free the signal switch from the control of the brake-controlling means, when the engine stops upon cutting out the ignition, the solenoid being de-energized, the catch, 5, becomes again operative for connecting the switch lever with the brake control, so that without attention by the driver, said brake control would be operative when the engine starts again. But it will be seen that in order to secure this result, means must be provided for opening the switch, 14, automatically when the solenoid is de-energized by opening the ignition switch. This is effected by making the contact electrode, $14^a$, of the switch, 14, as the core of an electro-magnet whose energizing coil $14^c$, is in the circuit which the switch closes, and providing a light spring, $14^b$, for retracting the switch member, $14^d$, from said electrode, the spring being so light that the magnetic attraction of the electro-magnet when energized will overcome the spring and maintain the contact for closing the circuit. When the solenoid circuit is de-energized the electro-magnet is also de-energized and the circuit is broken at the switch, 14, and will only be restored by the operator manually moving the switch to contact with electrode 14ª for energizing both the solenoid and the electro-magnet.

I claim:—

1. In combination with a motor vehicle, a signal-switch device comprising a circuit controlling switch, a spring for holding it at open circuit position; operating connection from the speed-controlling means of the vehicle for closing the switch when the said means is operated for reducing speed; a catch device in said connection, and means operable at will for disengaging said catch device, to release the switch from the speed controlling means.

2. In the construction defined in claim 1, foregoing, the catch device being a one-way-engaging device.

3. In the construction defined in claim 1, foregoing, electrically operated means for disengaging the catch device, a circuit for energizing the same, comprising a circuit breaker mounted on the steering wheel.

4. In combination with the construction defined in claim 1, foregoing, means operatively connected with the power-controlling means of the motor, for restoring the catch to engaging position by the movement of said motive power controlling means to motor-stopping position.

5. In the construction defined in claim 1, foregoing, the connection from the brake-controlling means to the switch, comprising a quadrant lever pivoted on the switch lever; a spring-operated catch engaging the quadrant lever with the switch lever, and a spring reacting upon the quadrant lever for rocking it in the direction for engagement by the catch.

6. In the construction defined in claim 1, foregoing, the means for connecting the switch with the brake control comprising a quadrant lever fulcrumed co-incidentally therewith, a spring catch device on the switch lever adapted to engage the quadrant, and a spring reacting on the quadrant lever for rocking it relatively to the switch lever in direction for engagement by the catch.

In testimony whereof, I have hereunto set my hand at Chicago, Illinois, this 15th day of November, 1921.

WALTER VAN GUILDER.